Patented Dec. 12, 1922.

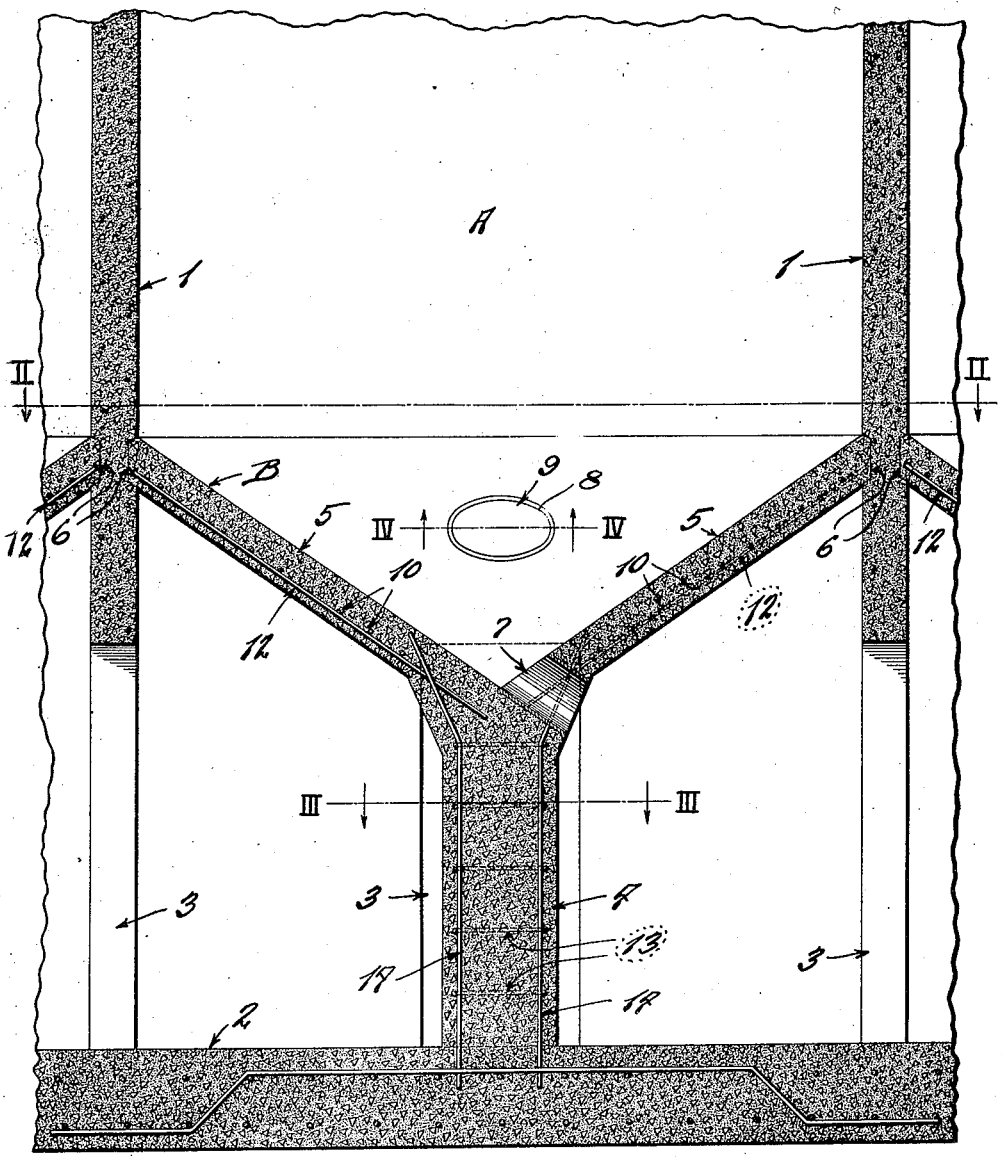

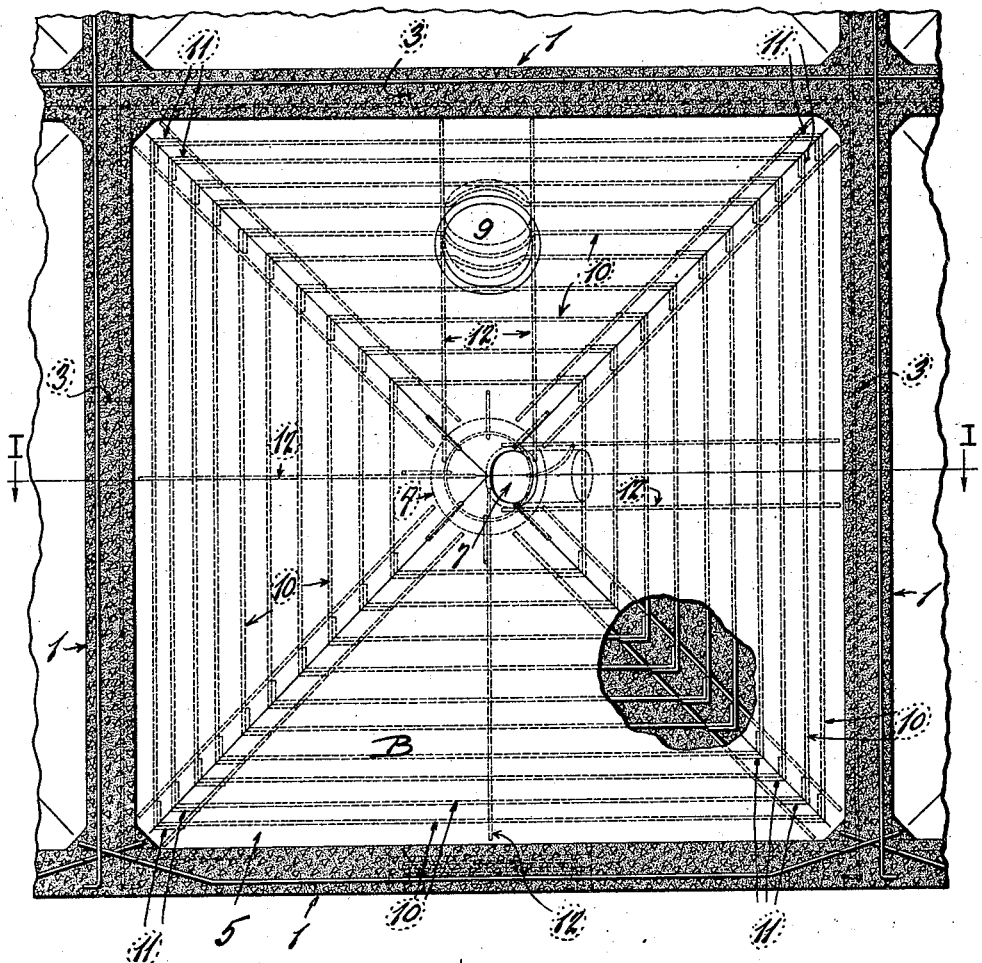
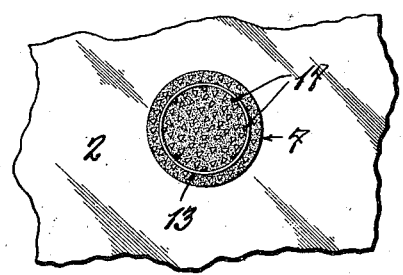

1,438,275

UNITED STATES PATENT OFFICE.

RICHARD C. STONE, OF ST. LOUIS, MISSOURI.

GRAIN BIN.

Application filed June 9, 1920. Serial No. 387,744.

*To all whom it may concern:*

Be it known that I, RICHARD C. STONE, a citizen of the United States of America, and a resident of the city of St. Louis, in the State of Missouri, have invented certain new and useful Improvements in Grain Bins, of which the following is a full, clear, and exact description, reference being had to the accompanying drawings, forming a part of this specification.

My invention relates to an improvement in grain bins, one of the objects of my invention being to so construct a grain bin having a hopper bottom, that the vertical stress due to the weight of the grain in the bin shall be transmitted through a very strong hopper bottom which co-operates with the side walls of the bin in supporting the load. Vertical thrusts may be transmitted from the hopper bottom to the side walls of the bin, and although the hopper is supported at the center, it is reinforced to prevent the transmission of lateral thrusts to the side walls.

Another object of my invention is to so construct a hopper bottom that the stresses in the base slab due to the weight of the bin and its contents will be minimized. This is accomplished by transmitting the load stresses of the hopper direct to the base slab at a point about midway between the enclosing bin walls.

Another object of my invention is to so construct a grain bin that the contents thereof will remain in a dry condition and sweating of the grain prevented. This is accomplished by providing means of ventilating the hopper bottom by an air circulation which keeps the hopper bottom dry and prevents the deterioration of the grain due to sweating at the hopper bottom.

Another object of my invention is to provide a hopper which can be easily emptied and easily cleaned. My construction provides for the ingress to and the egress from the hopper bottom from below whenever it is desired to clean the hopper.

With these and other objects in view, I will describe the invention more in detail, having reference to the accompanying drawing forming part of the specification and in which—

Fig. I is a vertical section on line I—I of Fig. II.

Fig. II is a horizontal section on line II—II of Fig. I showing the bin in section and the hopper bottom in plan, a portion of the bottom being broken away to show the reinforcing elements.

Fig. III is a section of the hopper supporting column taken on line III—III of Fig. I.

Fig. IV is a section taken on line IV—IV of Fig. I, showing the manhole opening and removable closure therefor.

1 designates the enclosing vertical side walls of the grain bin A resting upon a supporting base slab 2. The lower end of each of the side walls 1 is provided with openings 3 for purposes of ventilation to be hereinafter described. The supporting column 4 is located centrally of the hopper bottom, the hopper bottom having mutually convergent walls 5 extending across the bin and merging at the apex into the supporting column 4. To provide the required strength, the central column is preferably enlarged at the top, where it merges into the hopper bottom. The outer margins of the hopper bottom walls are preferably fitted into horizontal recesses 6 of the bin walls 1 so as to secure a good bond between the hopper bottom and the bin walls. A discharge spout 7 is located at the apex of the hopper bottom to one side of the center of the supporting column 4. This discharge spout is flush with the inner surface of one of the bottom walls of the hopper bottom and is parallel to the plane of the upper surface of the wall 5 opposite the wall in which the spout is located.

In erecting the bin, the tubular metal discharge spout 7 can be located at any desired point around the central column 4, to provide for the discharge of grain in any predetermined direction.

The column 4 is of a sufficient height so that a large space is provided between the base slab 2 and the bottom walls of the hopper. The openings 3 in the bin walls are located between the juncture of the hopper bottom and bin wall and the juncture of the bin walls and base slab. Air may circulate in this space and thus keep the hopper bottom dry.

A manhole opening 8 is provided in the hopper bottom and has a removable closure 9 flush with the inner surface of the hopper bottom. When it is necessary to clean the bin, ingress is had through the manhole 8 from below the hopper.

The hopper bottom and supporting column are preferably made of reinforced concrete. A series of parallel reinforcing rods or bars 10 are provided in the concrete bottom walls 5 and extend peripherally around the center of the hopper bottom. The ends of these straight rods 10 are overlapped at the meeting corners of the convergent walls of the hopper bottom as at 11 and rest upon rods 12 extending radially to the apex of the hopper bottom, these rods 12 being provided at the juncture of the converging walls of the hopper bottom and at points intermediate to the junctures. The central supporting column 4 is also provided with reinforcing rods extending peripherally of the column as at 13, and longitudinally of the column as at 14. The longitudinal ribs 14 are preferably extended into the base slab 2 and into the convergent hopper bottom 5 so as to provide a good bond therebetween.

Attention is now directed to the particular manner in which the concrete hopper bottom is formed and reinforced so that it can be firmly supported by the central column 4. This hopper bottom comprises four triangular wall elements designated by 5, and these concrete wall elements are combined to form an inverted hollow pyramid. Each triangular wall element is provided with a row of parallel reinforcing rods 10 which vary in length, the shortest rods 10 being near the center of the hopper and the longest being near the margins of the hopper. The parallel rods 10 in each triangular wall element 5 are lapped by the corresponding rods in two adjoining wall elements 5, so as to provide a series of continuous rectangular reinforcements extending around the center of the hopper bottom. Angular bends are formed by lateral extensions at the ends of each straight reinforcing rod 10, so as to anchor the rods in the concrete and at the same time securely unite the lapped ends at the corners of the continuous rectangular reinforcing elements.

When the hopper bottom is reinforced in this manner, the vertical stresses tending to spread or flatten the hopper, will be firmly resisted by the continuous reinforcements extending around the center of the hopper, and the central column 4 will effectively cooperate with the reinforced hopper bottom to form a support for the grain. By locating marginal portions of the hopper bottom in recesses 6 in the side walls 1, I cause the lower portion of these walls to cooperate with the hopper bottom in supporting the load.

Another advantage of using a central column 4 as a main load supporting element lies in the manner in which the vertical stresses are transmitted to the base slab 2. This slab corresponds to a beam supporting the tall vertical side walls 1 at its ends. The weight of these side walls tends to bend or deflect the base slab 2, and if the hopper bottom were supported entirely by the side walls, the base slab would be placed under tension at points below the center of the bin. However, in the new structure, the central column 4 is supported on that portion of the base slab below the center of the bin, so the stresses are more advantageously transmitted to the base slab, and this results in a saving of concrete and concrete reinforcement.

I claim:

1. A grain bin comprising a base, vertical side walls supported by said base, a single vertical column supported by said base, and a hopper bottom having flat triangular wall elements inclined upwardly from the top of said single column to said vertical side walls, said hopper bottom being made of reinforced concrete supported mainly by said single vertical column and partly by said side walls, and said side walls being recessed to receive the upper margins of said triangular wall elements.

2. A grain bin having a concrete hopper bottom comprising triangular bottom wall elements combined to form an inverted hollow pyramid, a central supporting column merging into the lower ends of said triangular wall elements, each of said triangular wall elements being provided with a row of straight parallel reinforcing rods having lateral extensions at their ends embedded in two of the other triangular wall elements, the lateral extensions of each of said rows being lapped by the corresponding extensions of two adjacent rows, so as to provide continuous anchored rectangular reinforcements extending around the center of the hopper bottom, and radial rods in the adjoining margins of said triangular wall elements.

In testimony that I claim the foregoing I hereunto affix my signature.

RICHARD C. STONE.